US00RE34486E

United States Patent [19]

Waldmann

[11] E Patent Number: Re. 34,486

[45] Reissued Date of Patent:* Dec. 21, 1993

[54] COMPOSITIONS OF INORGANIC-ORGANIC ALLOY WITH HIGHLY CHARGED NITROGEN CONTENT POLYMERS AND THEIR MANUFACTURE

[76] Inventor: John J. Waldmann, 2129 Knickerbocker Dr., Charlotte, N.C. 28212

[ * ] Notice: The portion of the term of this patent subsequent to Feb. 20, 2007 has been disclaimed.

[21] Appl. No.: 772,389

[22] Filed: Oct. 7, 1991

Related U.S. Patent Documents

Reissue of:

[64] Patent No.: 4,902,779
Issued: Feb. 20, 1990
Appl. No.: 842,515
Filed: Mar. 21, 1986

U.S. Applications:

[63] Continuation-in-part of Ser. No. 749,343, Jun. 27, 1985, Pat. No. 4,891,422.

[51] Int. Cl.[5] ..... C08G 73/00

[52] U.S. Cl. ..... 528/422; 524/443; 524/444; 524/612

[58] Field of Search ..... 528/422; 524/423, 437, 524/612

[56] References Cited

U.S. PATENT DOCUMENTS 4,490,417 12/1984 Shindow et al. ..... 524/512

*Primary Examiner*—John Kight, III
*Assistant Examiner*—Richard Lee Jones
*Attorney, Agent, or Firm*—Isaac A. Angres

[57] ABSTRACT

Inorganic-organic alloy polymer adduct *or organic blends polymer* compositions for waste water treatment, having the formula:

$A.B^{+}.C.D^{+}$ wherein A is from 0% to 98% by weight of the total alloy composition, and is selected from the group comprising: polyhydroxyaluminumchloride, hydroxyaluminumchloride, polyhydroxyaluminumagnesiumchloride, [polyhydroxyaluminumagnesium sulfate,] polyhydroxyaluminumagnesiumsulfate, hydroxyaluminumsulfate, polyhydroxyaluminumzincoxidechloride, polyhydroxyaluminumchlorosulfate, polyhydroxymagnesiumchlorosulfate, polyaluminumferricchloride, polyaluminumferrouschloride, polyaluminumcholridesulfate, polyhydroxyaluminumchloridesilicate, [*and*] *polyhydroxyaluminumsodiumsulfophosphate; and aluminum salts; where A vary from 0% to 100%*

$B^{+}$ is from [2% to 98%] *0% to 100%* by weight of the total alloy composition, and is selected from the group comprising polymers or resins made from guanidine, dicyandiamide, or cyanoguanidine compounds, copolymerized with cationic charges, multiple organic cationic charges, protonized agents, alkylamines, alkanolamines, alkyl, or hydroxyalkylguanidine, or any mixture thereof;

C is from [0 to 95%] *0 to 100%* by weight of the total alloy composition, and is an aqueous solution of cationic resin mixed with a reagent selected from polyalkylamines, polyethylenepolyamines, N-substituted ethyleneimines, polyquaternary compound, 1,3-bisquaternaryammonium compound, and polyquaternaryalkylamines; [and] *melamine-formaldehyde protonized or quaternized or their blends.*

$D^{+}$ is from [0% to 95%] *0% to 100%* by weight of the total alloy composition, and is selected from the group comprising aqueous solutions of the quaternary ammonium compounds *like PDADMAC, or cationic (co)polyacrylamide, or their (co)polymers,* [and their ethylenically unsaturated (co)polymerizable compounds,] POLYDADMAC melamine formaldehyde alloy, Manich type, (co)polyacrylamidemelamineformaldehyde alloy polymers, incorporated therein *and provided that at least one of A, $B^{+}$*, C, $D^{+}$ is positive.

Methods for making the compounds are also disclosed.

31 Claims, No Drawings

COMPOSITIONS OF INORGANIC-ORGANIC ALLOY WITH HIGHLY CHARGED NITROGEN CONTENT POLYMERS AND THEIR MANUFACTURE

Matter enclosed in heavy brackets [ ] appears in the original patent but forms no part of this reissue specification; matter printed in italics indicates the additions made by reissue.

CROSS-REFERENCE TO RELATED APPLICATION

This application is a continuation-in-part application of co-pending U.S. patent application Ser. No. 749,343 filed June 27, 1985 *now U.S. Pat. No. 4,891,422.*

BACKGROUND OF THE INVENTION

The present invention relates to compositions of matter, which may be used to purify industrial waste water and other industrial waste liquids, solids or semiliquids, chemicals, demulsification processes, in the pulp and paper industry (e.g. sizing processes, drainage, retention, flotation), mining industry, clay industry or other industries which have a waste water or waste liquid problem.

It is well known that guanidine resins or polymers are of low molecular weight, and have very limited shelf life, in most cases less than 3 months, often only a few days or weeks. Low cationic charge polymers are of limited use in industrial water treatment of potable water. Treatment is very limited, since the free formaldehyde content is high. Most of the products can be used only as coagulants in connection with alum, $AlCl_3$, $FeCl_3$, $Fe_2(SO_4)_3$ and mixtures of these salts, at a pH of from 6.0 to 9.0.

It has been found that reaction of guanidine, guanidine charged polymers or guanidine alkylamine/alkylamine polymers with inorganic adduct polymers and/or its guanidine derivative polymers alloy with organic alkyl or alkylene polyamine and adducts with inorganic adducts polymers will form very stable multi cationic or anionic polymers which can be used as coagulant and coagulant-flocculants with or without any electrolytes from a pH of 2 to a pH of 13.5.

These products can be used in any kind of industrial waster water, potable water, acid rain water purification, sludge coagulation and solidfications, or dust suppressant applications.

The inorganic-organic adduct polymers are twice as efficient as regular guanidine resins, having a shelf life from at least one year to four years, depending on the composition. The products produce low volume sludges, which relieve large volume disposal problems for the environment.

The invented compositions are made from inorganic polymers in reaction with guanidine polymers and their organic alloy with high nitrogen content compositions of polyamines, polyquaternized polymers, polyamides, and polyamine-polyamide polymers.

This invention generally relates to the novel of inorganic-organic alloy (co)polymers of the formula:

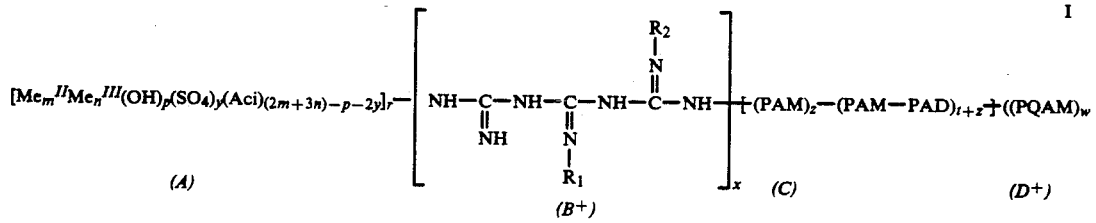

I where:

r=0 to [98%] *100%*

$Me_m^{II}$ is a divalent cation group selected from Mg, Zn, Ca, $Fe^{2+}$, and m=0 to 5;

$Me_n^{III}$ is a tri-or more valent metal, preferably Fe, Al, or Al-Zr complex, and n=1 to 20;

Aci is selected from the monovalent anionic group of (a) $Cl^-$, (b)$Br^-$, $I^-$, (d) $NO_3^-$, (e) $CH_3COO^-$, and (f) a mixture of these preferably Aci is $Cl^-$);

PAM, PAD and PQAM stand for polyamine, polyamide and polyquaternized polymers;

p=0 to 75;

y=0 to 15;

x=preferably 0 to [98%] *100%* by weight in compositions;

z=percentage by weight of the polyamine in the alloy composition, which can vary from 0 to [95%] *100%*;

t=percentage by weight of the polyamide, which can vary from 0 to 95%;

t+z=percentage by weight of the mixture of polyamide-polyamide, which can vary in compositions from 0% to 95% by weight;

w=percentage by weight of the quaternary ammonium and/or allyltrialkylammonium compounds, which can vary from 0 to [98%;] *100%*

$2m+3n>2y+p$; $z>t$ $R_1$-refers to the *hydrogen or* bridge cationic and/or multiple organic cationic charges, which can vary from 0% to [98%] *80%* by weight;

$R_2$-refers to the *hydrogen or* alkyl phosphonic esters and/or amine derivatives, phosphonium cationic charge groups, such as tetrakis (hydroxymethyl)-phosphonium halide, hydroxide, oxalate, acetate, sulfate, phosphate, tri-hydroxymethyl-phosphonium or halide derivatives, or tetramethylhalide phosphonium halide derivatives, the halo-group being chlorine, bromine, or iodine, which can vary from 0 to [98%] *80%* by weight.

OBJECTS OF THE INVENTION

It is the primary object of this invention to provide compositions of matter useful to purify industrial waste water (w.w.) and other industrial waste liquids, solids or semiliquids, from chemical plants, demulsification processes, pulp and paper industry (such as sizing processes, drainage, retention, or flotation), mining industry, and clay industry, waste water from textile manufacturing and processing operations, waste water from sugar refining operations, waste water from soap manufacturing operations, waste water from petroleum operations, waste water from chemical and rubber industries, waste water from tanning operations and waste water from construction and agricultural operations.

It is also an object to provide a method for making such compositions, *and that at least one of A, B, +C, D+ is positive.*

DETAILED DESCRIPTION OF THE INVENTION

The present invention is an inorganic-organic alloy polymer adduct composition having the formula: A.B+.C.D+. Each component is described hereafter in detail.

COMPONENT A

The novel bloc(co)polymer alloy of inorganic polymers (A) is defined by any of the following general formulas, I(a) through I(f):

$$\text{I(a)}: [Me_m^{II}\, Me_n^{III}\, (OH)p\, (SO_4)y\, (Aci)_{(2m+3n)-p-2y}]r;\ r=0 \text{ to } 100\%\ bw$$

wherein:

$Me_m^{II}$ is a divalent cation group selected from Mg, Zn, Ca, $Fe^{2+}$ and m=0 to 5;

$Me_n^{III}$ is a tri- or more valent metal, preferably Fe, Al, or Al-Zr complexes, and n=1 to 20;

Aci is selected from a monovalent anionic group consisting of (a) $Cl^-$, (b) $Br^-$, (c) $I^-$, (d) $NO_3^-$, (e) $CH_3COO^-$ or (f) a mixture of two or more of the foregoing, but preferably Aci is $Cl^-$.

These products may be prepared by a variety of processes as described in U.S. patent application Ser. No. 646,012, Filed Aug. 31, 1984, now U.S. Pat. No. 4,566,986.

$$\text{I(b)}: [Al_m\, (OH)_n]\ Al_n(OH)_m\, X_{3m-n-2k}\, (SO_4)_k$$

wherein:

X is sodium or potassium aluminate, *chlorine* k, m, n are positive numbers, *n=1 to 18, m=0 to 21, k=0 to 5;*

$$\text{I(c)}: Al_{1-x}\, Fe_x^{III}\, Fe_y^{II}\, [(OH)_{3+2y-2}]\ (OH)_{3+2y-z}(Hal)_z$$

wherein:

Hal=chlorine, bromine, iodine, or a mixture thereof;

(x+y)/(1−x)=about 0.2 to 1.5, z<3+2y, and (3+2y−[2] z)/(3+2y)=about 0.24 to 0.67.

$$\text{I(d)}: Al_m\, (OH)_x\, (SO_4)y\, (H_2PO_4)_z$$

with the promise that the sum of x+2y+[2] z is 3; m and x are positive integers; and y and z are 0 and/or positive integers:*m=1 to 6, x=0 to 14, y=1 to 3, z=0 to 1.65.*

$$\text{I(e)}: [M_n e\, (OH)_m]\ Me_n(OH)_m\, X_{3n-m}$$

wherein:

m, n are positive integers *1 to 18, 0 to 21;*

[$M_n$e] $Me_n$ is a tri-or more valent metal, and

X is $Cl^-$, $CH_3COO^-$, or $NO_3$.

I(f): Regular salts of aluminum, iron, titanium, vanadium, chromium, antimonium, such as chloride, sulfates, phosphates, nitrates, acetates or mixtures thereof. thereof.

Inorganic adduct polymers, as the term is used in this specification, includes, without limitation:

1. Polyhydroxyaluminumchloride:

$$Al_4\,(OH)_9(Cl)_3,\ \text{or}\ Al_8(OH)_2\,(Cl)_3,\ \text{or}\ Al_{11}(OH)_{30}\,(Cl)_3;$$

2. Hydroxyaluminumchloride: $Al_2(OH)_5Cl$ as ChlorhydrolTR-50, AstrigenTR-50;
3. Polyhydroxyaluminumagnesiumchloride: $Al_3Mg\,(OH)_9\,(Cl)_2$;
4. Polyhydroxyaluminumcalciumchloride: $Al_7Ca_{0.0\text{-}4}(OH)_{17.01}(Cl)_4$;
5. Polyhydroxyaluminumagnesiumsulfate: $Al_4Mg(OH)_4(SO_4)_{3.5}$;
6. Hydroxyaluminum sulfate: $Al_2(OH)_4(SO_4)$;
7. Oxyaluminum sulfate: $Al_2O(SO_4)_2$
8. Polhydroxaluminumzincoxidechloride: $Al_3(OH)_3\text{-}ZnO(OH)(Cl)_5$;
9. Polyhydroxyaluminum and/or magnesiumchlorosulfate:
   $Al_4\,(OH)_6\,(Cl)_4\,(SO_4)$;
   $Al_4\,Mg\,(OH)_6\,(Cl)_4\,(SO_4)_2$; or
   $Al_3\,Mg\,(OH)_6\,(Cl)_3\,(SO_4)$;
10. Polyaluminumferic and/or ferrous chloride:

$$Al_2Fe_2(OH)_{3.32}(Cl)_{6.68}$$

$$AlFe_{0.25}^{II}Fe_{0.25}^{III}(OH)_{2.12}(Cl)_{2.13}$$

11. Polyaluminumchloridesulfate; and
12. Polyhydroxyaluminumchloro silicate.
13. Aluminumzirconium(penta or tetra)chlorohydrate:

$$Al_8Zr(OH)_{23}Cl_5\ \text{or}\ Al_4Zr(OH)_{12}Cl_4,\ \text{etc.}$$

COMPONENT B

Component B of the composition is guanidine[, and/or] *or* dicyanodiamide and/or a cyanoguanidine compound, such as a resin guanidine or polymer charged guanidine, defined but not limited by any of the following formulas B(1) through B(7):

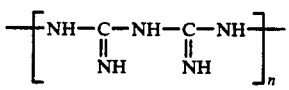

B(1)

where n is less than 100,000.

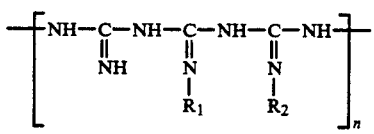

B(2)

where $R_1$ refers to *hydrogen or* bridge cationic charge and/or multiple organic cationic charges, which may vary from 0% to 80% by weight of the composition; $R_2$ refers to *hydrogen or water soluble protonization agents or quaternization agents such as* the alkyl phosphonic acid ester and/or amine derivatives of phosphonic acid, *phosphoric or phosphorous acid, sulphamic acid* which will form the phosphonium *or sulfonium* cationic charge groups, from 0 to 80% bw of the composition.

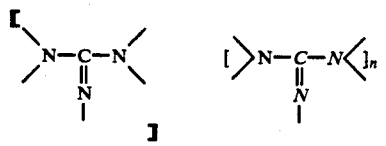

B(3)

in which the residue may be dicyandiamide, bisguanidine or guanidine sulfate guanylurea, 1-carbonylguanidine, guanidine, substituted diguanidine for example, alkyl, *hydroxyalkyl,* aryl, cycloalkyl, alkaryl and derivatives thereof, reaction of guanidine compound with polyamines or polyalkylene polyamine, such as aminoethyl propylene diamine, tripropylene tetramine, dipropylenetinamine, triethylene tetramine, propylene diamine, diethylene tetramine, ethylene diamine, 3-azahexane-1,6-diamine, 4,7-diazadecane-1,10-diamine, 4,7,11-trizatetradecane-1,14-diamine, [N,N,N,N',-2-pentamethyl-12,-propanediamine,] , *N,N,N',N'-2 pentamethyl-1,2-propanediamine* 2-methyl-1,2-propanediamine, 1-dimethyl amino-2-amino-methylpropane, polyglycolamine, acidic amidene forming like imidozoline or the tetrahydropyrimidene and polyamine-polybasic acid condensation products.

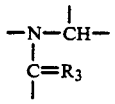

B(4)

where $R_3$ may be an oxygen atom, a sulfur atom, an NH group or N-, an $NH_3^+$ group, an NR group where R may be H, $CH_3$, $C_2H_5$, $C_4H_7$, or the alkyl group.

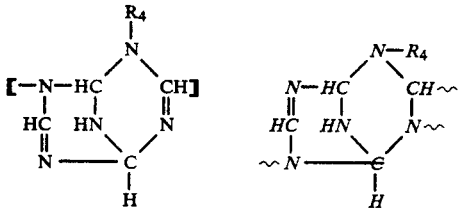

where $R_4$ may be a hydrogen atom or an unsubstituted or substituted alkyl, heterocyclic, cycloalkyl or aryl radical, alkaryl or aralkyl radical or derivatives thereof.

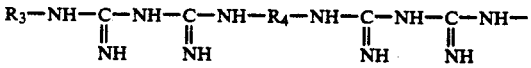

B(6)

where $R_3$ and $R_4$ represent bridging groups in which together the total number of carbon atoms directly interposed between the pairs of nitrogen atoms linked by $R_3$ and $R_4$ is more than 2 and less than 18*a*, polymethylene chain optionally interrupted by heteroatoms such as oxygen, sulfur or nitrogen.

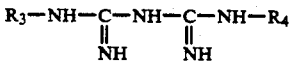

B(7)

[wherein: in B(2): $R_1$ refers to the bridge cationic charge and/or multiple organic cationic charges or mixture of thereof, such as but not limited to:] *wherein $R_3$ and $R_4$ have the meanings defined above, or $R_3$ and $R_4$ are the same representing the bridging groups such as CN—NH—(a), or*

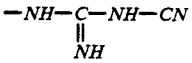

*(b) when the polymer are terminated either by an amino hydrochloride groups as defined above or both (a) and (b) are the same. In B(2): $R_1$ may be hydrogen or the bridge cationic charge or multiple organic cationic charges or mixture thereof, which can react with any of the formulas B91) or B93) to B(7), such as but not limited to:*

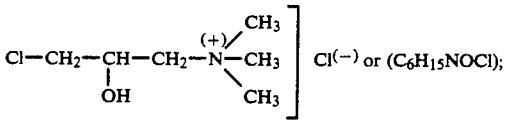

(a)

$Cl^{(-)}$ or ($C_6H_{15}NOCl$);

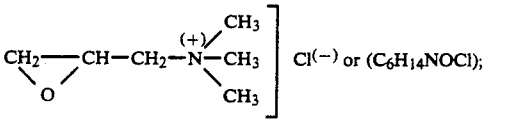

(b)

$Cl^{(-)}$ or ($C_6H_{14}NOCl$);

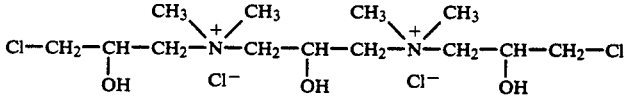

(c)

B(5) or ($C_{13}H_{30}N_2O_3Cl_4$);

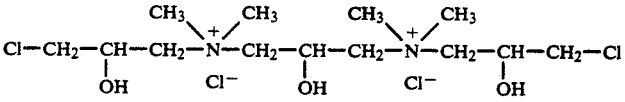

(d)

where n = 1 to 10;

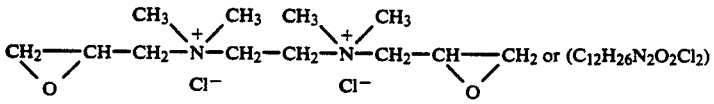

(e)

or $(C_{12}H_{26}N_2O_2Cl_2)$

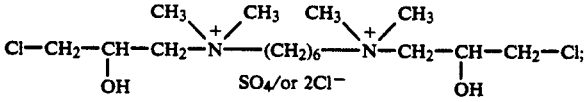

(f)

or $(C_{16}H_{36}N_2O_6Cl_2S)$ or $C_{16}H_{36}N_2O_2Cl_4$

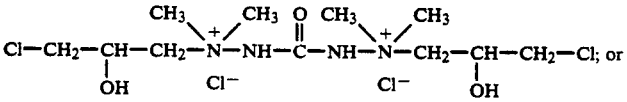

(g)

$(C_{11}H_{26}N_4O_3Cl_4)$;

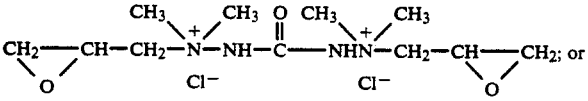

(h)

$(C_{11}H_{24}N_4O_3Cl_2)$;

(i) N,N,N,N',N',N'-hexaalkyl-B-hydroxy-trimethylene diammonium dihalide

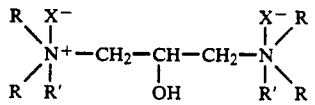

wherein,

R is alkyl radicals with $C_1$ to $C_4$ atoms

R is alkyl radicals or alkylene-alkyl with $C_1$ to $C_3$ atoms

X is selected from group consisting of chlorine, bromine and iodine; and (j) a mixture of any of (a) through (i).

[In B(3): $R^2$ refers to] *In B(2): $R_2$ refers to hydrogen or water soluble protonization agents or quaternization agents such as* the dialkyl hydrogen phosphite, ester amines, phosphorus acid and its esters or salts, $H_3PO_4$ and its salts, such as sodium dihydrogen phosphates, including the following:

(a) dimethyl hydrogen phosphite;

(b) hydroxyethylidene-1,1-diphosphonic acid and its salts (of Li, Na, K, and $NH_4$)

(c) diethlyenetriaminepentmethylene phosphonic acid and its salts (Li, Na, K, $NH_4$)

(d) carbonyl diamidetetramethylene phosphonic acid and its salts (Li, Na, K, $NH_4$)

(e) N(2-aminoethyl piperazine) phosphonic acid and its salts (Li, Na, K, $NH_4$)

(f) N(2-aminoethylmorpholine) phosponic acid and its salts (Li, Na, K, $NH_4$)

(g) 2 (heptyl-2-imidazoline) phosphonic acid and its salts (Li, Na, K, $NH_4$)

(h) phosphoric acid and its salts, such as sodiumdihydrogenphosphate, (i) methylene phosphonic acid substituted amide-$>N—CH_2PO_3H_2$ made from Urea (U)-Formaldehyde (F)-phosphorus acid and/or mixture of phosphorus acid/hydrochloric acid where the HCl is used as a catalyst from 0.25 to 0.5 mole, the mole ratio of $U—CH_2O—H_3PO_3$ being 1:3.50:3.25.

(j) tetrakis-hydroxymethyl)-phosphonium: halide, hydroxide, oxalate, acetate, sulfate, phosphate: the halo group being chlorine, bromine, or iodine.

(k) tris-(3-halo-2-hydroxyalkyl) hydroxymethylphosphonium halide; the halo and/or halide group being chlorine, bromine or iodine, and the alkyl group being ethyl or propyl.

(l) tri-hydroxymethyl-phosphine or halide derivatives; the halo group being chlorine, bromine, or iodine.

(m) tetramethylhalide, phosphonium halide derivatives; the halo group being chlorine, bromine, or iodine.

(n) urea (U)-formaldehyde (F)-ammonium sulfamate condensate product (2:1.0:9.78 mol ratio).

The products, symbolically represented as:

$$[(A)]+[B^+(2) \text{ and/or } B(3)],$$

can give strong (co) polymers charged with long pot life and high potential polyelectrolytes. The product will have on the macromolecular chain graft the phosphonium anion and/or it will have on the chain (or between two or more macromolecular chains attached the polyfunctional ammonium cationic charge unit(s) having as permanent unit the chlorine ($Cl^-$) and/or sulfate $(\frac{1}{2}SO_4)^{2-}$ permanent graft. In the present invention, chemically quaternized products are attached to form a cationic guanidine through bridges of component B as shown in the formulas $B^+(2)$ and B(3).

For instance, one of the examples could be suggested by using in the reaction the products;

$$B^+(1)+B^+(2)a)+B(3)a); \text{ or}$$
$$B^+(1)+B^+(2)b)+B(3)a)$$

and a polyammonium salt charged will be formed such as:

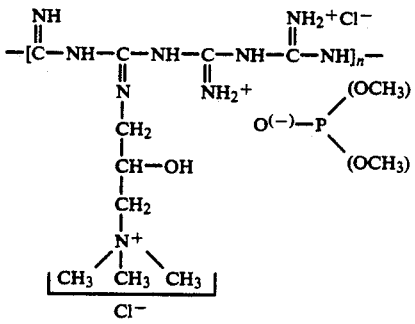

or

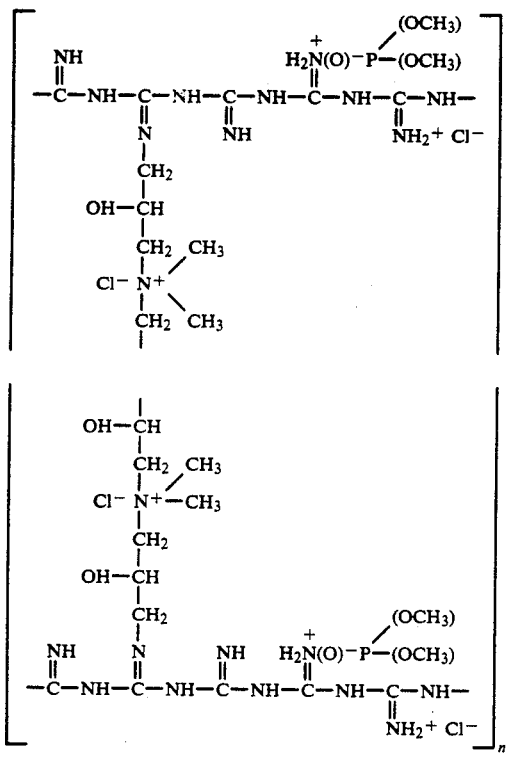

In C and [D,] $D^+$ the inorganic-organic alloy *or organic blends polymer* could be further reacted [and/or] *or* mixed *with* quaternary polyamines, with or without alkylene polyamines and polyamides [and/or] *or* mixture of the polyamines (PAM) with polyamides (PAD), (PQAM) to generate the 3rd and 4th segment of the generic formula (I).

COMPONENTS C AND [D] $D^+$

The polyamine defined by C and [D] $D^+$ incorporate the water soluble polymer condensation products of alkylamines, polyalkyl amines, ammonia, or a mixture of them, with polyfunctional aliphatic dihalides or halohydrins which may, if desired, be further reacted with urea or with urea-formaldehyde condensation products [and/or], melamineformaldehyde colloidal condensation products [and/or melamineformaldehyde] *or melamine-urea-formaldehyde* condensation products [and] *or* their organic alloys with polydiallydimethylammonium chloride, or polyacrylamide Manich (co)polymers, or lignosulfonate natural polymers of metal salts such Na, K, $NH_4$, Ca or a combination of these, [and/or] *or* dimethylol urea, the final product being water soluble.

Examples of polyfunctional aliphatic compounds are ethylenedichloride, alphadichlorhydrin, dibromohydrin, diidohydrin, epichlorohydrin, epibromhydrin, epiiodohydrin, diepiiodohydrin. The alkylene polyamine used in preparing the cationic reaction products employed in practicing my invention are well-known compounds corresponding to the formula $H_2N(C_nH_{2n}HN)_xH$ in which x is one or more typical amines of this class of alkylene polyamines, such as diethylenetriamine, triethylenetriamines, tetraethylenepentamine and the corresponding polypropylenepolyamines and polybutylenepolyamines. This class also includes polyalkylenediamine such as N,N,N',N'-tetramethylethelynediamine (TMEDA); tetramethylenebutanediamine (TMBDA) N,N,N',N',2 pentamethyl-1,2-propanediamine; 1,1,3,3-tetramethylguanidine; N,N,N',N'-tetramethyl-1,6-hexane diamine; N,N,N',N'-tetramethyl-1,3-propane diamine; and 1,1,3,3-tetramethylurea.

Such products are described in the following U.S. Patents and the references cited in them:

| | |
|---|---|
| U.S. Patent Re 28 807 | 3,855,299 |
| 2,765,229 | 3,894,945 |
| 2,969,302 | 3,920,546 |
| 3,372,129 | 3,958,931 |
| 3,468,818 | 4,052,259 |
| 3,738,945 | 4,059,515 |
| 3,751,474 | |

In component [D,] $D^+$ other quaternary ammonium compounds [and an ethylenically unsaturated copolymerizable compound] *such as poly (DADMAC), or cationic (co)polyacrylamide or their (co)polymer compounds* are incorporated as the segment (PQAM) of the generic formulae:

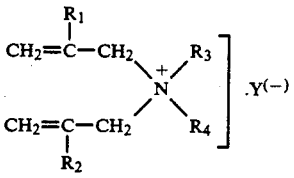

or other structures as are described in U.S. Pat. Nos. 3,311,594, 3,645,954, 3,585,148, 2,926,161, 2,923,701, 4,053,512, 3,032,539, and 2,550,652.

The inorganic adduct polymers which are multianions can display the monoactivity charges of ($Cl^-$) or $\frac{1}{2}$ $SO_4^{2-}$ by the multivalent metal anion system generating more active flocculants and/or coagulants.

For instance, if an inorganic adduct polymer such as aluminumhydroxysulfate is reacted with polydiallydimethylammoniumchloride, the chloride anion ($Cl^-$) will be displayed by the multi anion, thus:

$$Al_2(OH)_4SO_4 \underset{k_a}{\overset{k_d}{\rightleftharpoons}} Al(OH)^{2+} + Al(OH)_2SO_4^-$$

where the dissociation constant ($k_d$) is greater than association constant ($k_a$);

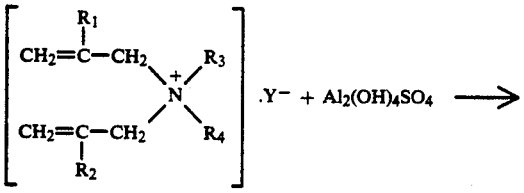

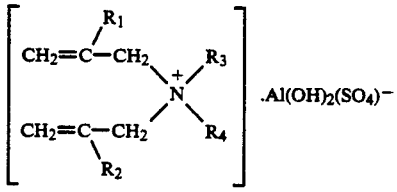

where $R_1$ and $R_2$ represent hydrogen, methyl and ethyl radicals, $R_3$ and $R_4$ each represents alkyl, alkoxyalkyl, hydroxyalkyl radicals having one to 8 carbon atoms and Y represents an anion and 2 complex anions, such as methosulfate, ethosulfate, chlorine, bromine and iodine.

The polyamide and/or polyamine are made by reaction of dibasic carboxylic acid, such as adipic acid, with epsilon caprolactam and/or diethylene triamine and/or polyalyleneamines having $C_4$–$C_8$, and/or by reaction of dibasic carboxylic acid first reacted with polyalkylenepolyamide containing the recurring groups:

$$-NH\ (C_nH_{2n}HN)_x\ CORCO-$$

where n and x are each 2 or more, and R is a divalent hydrocarbon radical of dibasic carboxylic acid. The long chain polyamide is then reacted with epichlorohydrin (EPI) and/or other haloderivative products mentioned above. The Group of Components [D] $D^+$ can include products with or without N- substituted polyacrylamide quaternary ammonium salts (co) polymers, *or cationic (co)polyacrylamide* or polyallyltrialkylammonium (co)polymers, such as polydiallyldimithylammoniumchloride (POLYDADMAC). (co)polymers of hydrochloride of N,N diallylglycine, polydiallylamine are also incorporated into the present invention.

DETAILED DESCRIPTION OF THE INVENTION

It is known that guanidine resins can be made either alkaline or acidic in pH. In either case, the products are not of high molecular weight and have a very short pot life. The gelation effect is very common to all of them. The guanidine resins are very sensitive to water, therefore water must be added slowly. It is known that even in the presence of Bronsted or in the presence of Lewis acid catalyst, such as ammonium chloride, ammonium sulfate, and/or ammonium nitrate, very few anions such as chlorine, sulfate and/or nitrate are attracted by the molecule to form stable ammonium type products.

The guanidine polymers and/or resins are made in the pH range from 0.5 to 7.0, but preferably about pH 5.5. These polymers can be made by reacting the guanidine and/or dicyandiamide with urea, ethylene diamine, and/or triethylenetetramine hydrochloride, ammonium chloride, ammonium sulfate, ammonium nitrate, formaldehyde and/or paraformaldehyde, hydrochloric acid. The stable guanidine polymers and/or resins can be made by co-reacting the guanidine monomers and/or dicyandiamide in the presence of mono and/or polyfunctional amines or other HCl salts in the pH range from acid to 9, but preferably about pH 5.5, such as:

(B):(1) Aminoethylethanolamine
(2) Monoethanolamine
(3) Diethanolamine
(4) Hydroxyethylethylenediamine
(5) Hydroxypropylethylenediamine
(6) Guanidine-bis-N,N'-hydroxyethylethylenediamine
(7) N,N'-hydroxyethylaminoethylurea
(8) N,N'-bishydroxyethylhydroxymethylaminoethylurea
(9) N,N'-bisguanidineethlenediamine
(10) N,N'-bishydroxymethylethylethylenediamine
(11) N,N'-bisguanilurea, guanidine compounds with polyamines or polyalkylenepolyamine, such as amino ethyl propylenediamine, tripropylene tetramine, dipropylenetriamine, triethylene tetramine, propylene diamine, diethylene tetramine, ethylene diamine, or dodecylamine (although the reaction proceeds without a catalyst, a catalyst such as inorganic salts, sulfonic acids, glacial acetic adic, or the like, may be employed to accelerate the reation).
(12) 2,(2-aminoethoxy)ethanol
(13) Polyethyleneamine with Mw≦500,000, preferably 100,000
(14) Polydiallydimethylammoniumchloride (Mw≦500,000)
(15) [Polyalkylamine,] *Polyamines* with Mw less than 500,000, preferably less than 100,000
(16) Water soluble melamine sulfonate products such as those made from melamine-formaldehyde sodiumbisulfite are preferably incorporated in the present invention, having been described in U.S. Pat. No. 2,407,599
(17) Polyacrylamide-amino plast resin compositions as described in U.S. Pat. No. 2,862,901
(18) Polyalkylamine ammonium salts and/or aminoalkylurea represented generically by the formula:

$$H_2N—C—NH—(CH_2)_nNH_mR$$

where n is an integer from 2 to 4, m is an integer from 1 to 4, and R is H, an alkyl, or an hydroxyalkyl group of 1–2 carbon atoms. The aminoalkyl groups set forth in the formula include: $CH_2CH_2NH_2$; $CH_2CH_2$—NH—$CH_2CH_2$—$NH_2$; $CH_2CH_2$—NH—$CH_2CH_2$NH—$CH_2CH_2OH$; and $CH_2CH_2$—NH—$CH_2CH_2$NH—$CH_2CH_2NH$—$CH_2CH_2NH_2$;
which are disclosed in U.S. Pat. No. 2,616,874.
(19) Sulfamic acid/ethylene urea reaction products having generically the formula of:

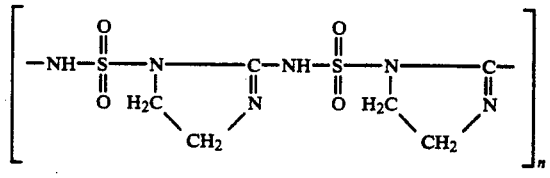

where n≦250 are incorporated in the present invention.
(20) Benzoguanamine *or melamine* (1 mole) with formaldehyde (1.2–3.5 moles) are incorporated in the present invention.
(21) Polydiallydimethylammoniumchloride (PDADMAC) and its copolymers having a Mw≦500,000 are incorporated in the present invention.

(22) B-hydroxyethylsulfone and condensation products of sulfonated dihydroxydiphenylsulfones or sulfonated dihydorxydiphenols lower alkylaldehydes or lower aliphatic aldehydes are incorporated in the present invention.

(23) With and/or without alkylamines or polyalkyl or cycloalkylamines or bis tertiaryalkylurea amines, having $C_2$-$C_8$ atoms bridges between nitrogen atoms such as ethylenediamine, diethylenetriamine or others defined by the formula:

$$H_2N\,(C_nH_{2n}HN)_xH$$

where x is one or more or with tri or tera substituted hexamethylene triamine or piperazine in the presence of the polyfunctional and reactive ammonium quaternized products, in particularly with $Cl^-$ or $\frac{1}{2}SO_4^{2-}$, such as:

(23) 1.

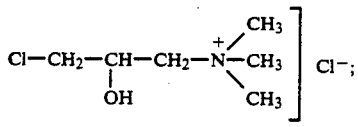

or ($C_6H_{15}NOCl$)

(23) 2.

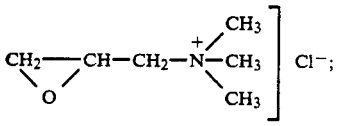

or ($C_6H_{14}NOCl$) by reacting trimethylamine (1 mole) with Epichlorohydrin (EPI) (≧3.5 moles) and/or bis tertiaryalkylenealkylamine with (EPI).

(23) 3.

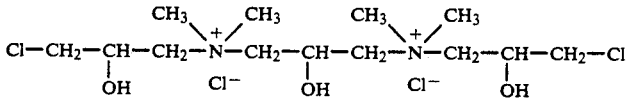

or ($C_{13}H_{30}N_2O_3Cl_4$)

(23) 4.

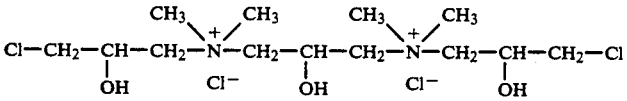

(made from dimethylaminehydrochloride, dimethylamine and epichlorohydrin (EPI).

(23)5.

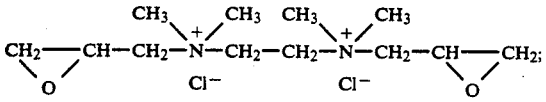

or ($C_{12}H_{26}N_2O_2Cl_2$) (made from N,N,N,N'-tetramethylethylene diamine and epichlorohydrin (EPI).

(23) 6.

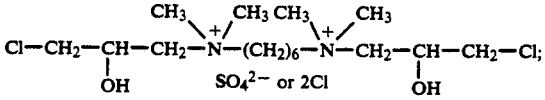

or ($C_{16}H_{36}N_2O_6Cl_2S$) or ($C_{16}H_{36}N_2O_2Cl_4$) (made by reaction of N,N,N',N' Tetramethylhexamethylenediamine in reaction with epichlorohydrin and sulfuric acid/or hydrochloric acid).

(23) 7. N,N,N,N',N',N'-hexalkyl-B-hydroxy trimethylene diammonium halide

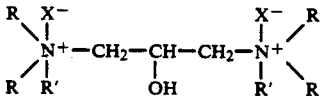

wherein

R is an alkyl radical ($CH_3$, $C_4H_9$)

$R_1$ is alkyl or alkylene-alkylradicals with $C_1$ to $C_3$ atoms ($CH_3$, $CH_2{=}CH{-}CH_2$, etc.)

X is selected from the group consisting of chlorine, bromine and iodine (made by reaction of dimethylamine or butylamine, epichlorohydrin and methylbromide).

(23) 8. Tris-(3 halo-2-hydroxyalkyl)-hydroxymethyl phosphonium halide; the halo and/or halide group being chlorine, bromine or iodine; the alkyl being ethyl or propyl. In this example is used chlorine and propyl radicals: ($C_{10}H_{21}O_4PCl_4$).

(23) 9. Tetrakis-(hydroxymethyl)-phosphonium halide, hydroxide, oxalate, acetate, sulfate or phosphate, the halo group being chlorine, bromine or iodine; ($C_4H_{12}O_4PCl$)

(23) 10. Tris-(2-hydroxyethyl)-hydroxymethyl phosphonium chloride ($C_7H_{18}O_4PCl$).

(23) 11. Tetramethyl halide phosphonium halide derivatives, the halide being chlorine, bromine or iodine.

The inorganic adducts polymers described in formulae (A) or (I/a to I/e) and the regular salts as described by [I/(8)] *(I/f)* can be reacted with guanidine (co)polymers made from wide ratios between guanidine [and/or] *or* dicyandiamide-formaldehyde-ammonium chloride such as:

0.356–2.0; 0.490–5.0; 0.5–2.0

[and/or] *or* in presence of alkylamine *or hydroxyalkylamine* in the range:

0.5–4.0; 1.5–9.0; 0.3–2.0; 0.05–0.5

The most preferable products to be charged or having the radicals $R_1$, $R_2$ of formula B(2) as cationic charge group can be made from mole ratios of guanidine and/or dicyandiamide to formaldehyde to ammonium chloride such as:

1.0–2; 2–4; 1–2.

Guanidine, guanidine charged or quaternized polymers made in accordance with this invention remained stable more than three years at high solid concentrations versus only a few weeks or months for regular resins of this class.

The inorganic adduct polymers as described above, and/or regular salts of trivalent or higher metals can be reached with guanidine (co)polymers with polyamine-polyamide organic alloys to form stable high potentials coagulants-flocculants polymers. For high stability, the polyamide (PAD) and polyamine (PAM) are recommended to be in the weight ratio of:

| Polyamide (PAD) | Polyamine (PAM) | Stability |
|---|---|---|
| 5.00 pbw | 1.00 pbw | yes |
| 4.950 pbw | 1.00 pbw | yes |
| 4.900 pbw | 1.00 pbw | yes |
| 4.830 pbw | 1.00 pbw | yes |
| 3.970 pbw | 1.00 pbw | yes |

The inorganic polymers [and/or] *or* regular salts as described above can be used from 5% to 95% by weight and the [polymine and/or] *polyamine or* polymide [and/or] *or* polyamide/polyamine alloys can be used from 5% by weight to 95% by weight, to obtain stable complex adducts.

In the case of the reaction between inorganic adducts polymers and the guanidine, guanidine charged or quaternized polymers, and its alloys of polyamine and/or polyamide/polyamine, the weight percentage can vary from:

0–98% by weight of inorganic polymers or inorganic salts

95–0% by weight guanidine polymers, [and/or] *or*

0–98% by weight of inorganic polymers or inorganic salts

70–0% by weight of guanidine polymers

0–95% by weight of polyamine [and/or] *or* polyamide/polyamine, [and/or] *or* polyamide.

In the case of inorganic polymers and polyamine [and/or] *or* polyamide/polyamine, and/or polyamide, the percentage by weight can be from:

0% to 95% of polyamine [and/or] *or* polyamide/polyamine, and/or polyamide.

95% to 0% of inorganic polymers, quaternary ammonium [and/or] *or* allyltrialkylammonium compounds.

The multi charges complex adduct polymers flocculant should be used in an effective amount which is readily determinable in use. This statement is well explained in the case of the multiple cationic charge of polyamine polymers described in U.S. Pat. No. 3,894,945. Other multi-nitrogen or polyamine polymers are described in: U.S. Pat. Nos.: 2,990,397 and 3,617,570; U.S. Disclosure Document T965,001; Switzerland Patents CH Nos. 776,318 and CH 616,951; German Pat. Nos. 1,111,114; 855,001; 767,276; 671,704; 323,665; and 325,647; German OLS: 2,942,788; 2,321,627; 2,942,788 (Products A to E); and British Pat. Nos.: 314,358; and 632,936.

The coagulation performance is determined by the turbidity test described in ASTM D2035-68.

The invented products and processes for their formation along with relevant data are presented below. It will be understood that these examples are not intended as limiting the invention, but as examples of the operation of the invention.

EXAMPLE NO 1

A 2,000 ml resin kettle flask was equipped with condenser, a mechanical stirrer, a thermometer and an additional funnel. To the flask the following was added in order:

| | | |
|---|---|---|
| 1. 37% Formaldehyde | 541.5 g | 6.668 moles |
| 2. Dionized water | 50.0 g | 2.777 moles |
| 3. Dicyandiamide | 280.0 g | 3.333 moles |
| 4. Ammonium chloride | 178.5 g | 3.334 moles |

5. Mixing was started.
6. The reaction is endothermic followed by a strong exothermic reaction.
7. Let the exotherm go no higher than 90° C., preferably 80 °to 85° C.
8. When the exothermic reaction is over, hold the reaction at 80°–85° C. for an additional 3 hours.
9. Cool to 25°–30° C.
10. Adjust the product Specific Gravity to 1.150 to 1.200 g/ml, having pH=3.0 to 4.0.
11. 46.6 g HCl (18%) was added to the 500 g of the above product.
12. Agitation is continued for additional 15 minutes.
13. To the highly charged polymer, 120 g of 25% aluminum sulfate was added during a 15 minute period.
14. The agitation was continued for an additional 30 minutes.
15. At the end of this time the resultant product was drained off, having:
    pH=1.9
    Specific Gravity=1.180 g/cc Appearance=light yellow, transparent solution.

EXAMPLE NO 2

To the reactor described in Example No. 1 was charged:

| | | |
|---|---|---|
| (1) 44% formaldelyde (uninhibited, with pH = 8) | 83.63 g | 1.225 moles |
| (2) dionized water | 8.37 g | 0.465 moles |
| (3) dicyandiamide | 69.0 g | 0.821 moles |
| (4) [Ammonium chloride | 69.0 g (total) | 1.789 moles] |
| (5) [dionized water | 69.0 g (total) | 3.833 moles] |

1. Mixing was started with only 23 g of $NH_4Cl$ present
2. The exotherm was allowed to go no higher than 38° C. Heat, if necessary, was added to 30° C.
3. The exotherm was held at 50° C.
4. Twice consecutively, 17.25 g of $NH_4Cl$ was added and mixed for 12 minutes each time.
5. The exotherm was held at 55° C. and 11.5 g of $NH_4Cl$ was added.
6. When the exotherm reaction was over, the reaction was held at 90° C. for 4 hours.
7. The reaction was cooled to 25°–30° C.
8. The specific gravity of the product was adjusted to from 1.17 to 1.20 g/cc with 69 g dionized water having pH=4.75 to 4.80, and solids=50 to 55%

9. 18% HCl was added to lower the pH to the range of 3.3–3.7
10. Agitation was continued for an additional 30 minutes to obtain highly charged polymer.
11. To 95% bw of hydroxyaluminum chloride, 5% by weight of th4e above polymer was added.
12. Agitation was continued for an additional 30 minutes.
13. At the end of this time the resultant product was drawn off, having
    pH=3.45
    Specific Gravity=1.180 g/cc.
    Appearance=light yellow to water color solution

EXAMPLES NO. 3 to 15

Steps 11 through 15 of Example No. 1 were repeated by reacting 75% by weight of the polymer with 18% by weight of the following inorganic polymers under the conditions set forth in Table No. 1.

TABLE NO. 1

| Ex. No. | Polymer 75% bw | Inorganic adduct polymer used | Temperature | Time in minutes |
|---|---|---|---|---|
| 3 | Ex. No. 1 (Steps 1–10) | $Al_4(OH)_9(Cl)_3$ | 25–30° C. | 30 |
| 4 | | $Al_4Zr(OH)_{12}Cl_4$ | 25–30° C. | 30 |
| 5 | | $Al_2(OH)_4SO_4$ or $Al_2O(SO_4)_2$ | 25° C. | 30 |
| 6 | | $Al_3Mg(OH)_9(Cl)_2$ | 25–30° C. | 30 |
| 7 | | $Al_7Ca_{0.04}(OH)_{17.01}(Cl)_4$ | 30° C. | 40 |
| 8 | | $Al_4Mg(OH)_5(SO_4)_{3.5}$ | 25–30° C. | 30 |
| 9 | | $Al_3(OH)_3ZnO(OH)$ | 25–30° C. | 30 |
| 10 | | $Al_4(OH)_6(SO_4)_3$ | 25–30° C. | 30 |
| 11 | | $Al_4Mg(OH)_6(Cl)_4(SO_4)_2$ | 25–30° C. | 40 |
| 12 | | Polyaluminumchlorosulfate (PACS) | 25–30° C. | 30 |
| 13 | | $AlFe_{0.25}Fe_{0.25}(OH)_{2.12}(Cl)_{2.13}$ | 25° C. | 40 |
| 14 | | $Al_2Fe_2(OH)_{3.32}(Cl)_{6.68}$ | 25° C. | 40 |
| 15 | | Polyhydroxyaluminumchlorosilicate | 25° C. | 20 |

Steps 5 through 7 of Example No. 1 were repeated, then:

8. After 2 to 3 hours reaction time, the temperature was raised to 90°–95° C., preferably to 90° C.
9. 20 g or 0.106 mole of 3-chloro-2-hydroxypropyl trimethyl ammoniumchloride ($C_6H_{15}NOCl$) (HPTMAC) (B/IIa) was charged to the reactor during 3 minutes.
10. The reaction was continued at 90° C. for 60 minutes.
11. The product was cooled to 25°–30° C., when water colored polymer was obtained with:
    pH=3.55
    Specific Gravity=1.195
    Solids=52%
    Viscosity=105 centipoises

EXAMPLE NO. 15 B

Steps 1 through 11 of Example No. 15A were repeated, then:

12. To 500 g of the above product was added 7.977 g of HCl (18%), then during a 10 minute period, 64.22 g of 25% hydroxyaluminumchloride.
13. The agitation is continued for 30 minutes, when 25 g of dionized water was slowly added to the reactor.
14. The product was mixed for 5 minutes
15. At the end of this time the product was drained off, having:
    pH=2.8
    Specific Gravity=1.160 g/cc
    Solids=52%
    Appearance=light yellow color with blue collodal tint.

EXAMPLE NO. 17

To 500 grams of the product of Example 15 A was added 18% by weight of the inorganic polymers or salts as set forth in Table No. II, balance HCl and/or $H_2O$.

TABLE NO. II

| Ex. No. | Polymer 75% bw | Inorganic adduct Polymers used - 18% bw | Temp. in °C. | Time reaction in minutes |
|---|---|---|---|---|
| | Ex.No.15A Steps 1–11 | | | |
| 15B | | $Al_2(OH)_5Cl$ or $Al_8Zr(OH)_{23}Cl_5$ | 25–30 | 30 |
| 17 | | $Al_8(OH)_2(Cl)_3$ | 25–30 | 30 |
| 18 | | $Al_3Mg(OH)_9(Cl)_2$ | 30 | 30 |
| 19 | | $Al_4Mg(OH)_5(SO_4)_{3.5}$ | 25–30 | 30 |
| 20 | | $NaH_2PO_4$ or $H_3PO_4$ sodium-tripolyphosphate solution | 25–30 | 30 |
| 21 | | 20% aq $MgCl_2$ or 20% aq $CaCl_2$ | 25 | 30 |
| 22 | | 30% $AlCl_3$ or $FeCl_3$ or their mixture having $Fe^{2+}$ present | 25–30 | 30 |
| 23 | | Polyhydroxysodiumaluminum sulfophosphate ($Al_2O_3$ = 10%) | 25–30 | 45 |

EXAMPLE NO. 15 A

To the reactor described in Example Number 1, the following were charged:

| | | |
|---|---|---|
| 1. Dicyandiamide | 240 g | 2.857 moles |
| 2. 37% Formaldehyde | 490 g | 6.034 moles |
| 3. Dionized water | 90 g | 5.0 moles |
| 4. Ammonium chloride | 140 g | 2.616 moles |

EXAMPLE NO. 16 A

To the reactor described in Example Number 1, the following were charged.

| | | |
|---|---|---|
| 1. Dicyandiamide | 138.79 g | 1.652 moles |
| 2. 37% formaldehyde | 267.62 g | 3.304 moles |
| 3. Dionized water | 50.0 g | 2.777 moles |
| 4. Ammonium chloride | 88.38 g | 1.652 moles |

5. Mixing was started

6. The reaction is endothermic followed by a strong exothermic reaction.
7. Let the Exotherm go no higher than 80°-85° C.
8. When the exothermic reaction is over, hold the reaction at 80°-85° C. for 3 hours.
9. Heat the reactor to 90°-95° C.
10. Hold the reaction at 90°-95° C. for an additional hour.
11. 33.85 g/or 0.106 mole of polyfunctional cationic charge monomer described by the formula monomers above $[C_{13}H_{30}N_2O_2Cl_2]$[BII/c] was added.
12. The reaction was continued at 90° C. for 60 minutes.
13. The product was cooled to 25°-30° C. and water colored polymer was obtained.
14. Adjust the product specific gravity to 1.15-1.210 g/cc, having pH=3.0 to 4.5; viscosity=50-200 cps.
15. Water colorless product is obtained having:
    pH=4.0
    Specific Gravity=1.210 g/cc
    Solids=55%
    Viscosity=85 cps

EXAMPLE NO. 16 B

To 910 g of the product of Example 16 A, 109 g of polyhydroxyaluminumchloride $(Al_4(OH)_9(Cl)_3$ was added over a period of 10 minutes and then reacted for 30 minutes. A product having a light yellow color with blue colloidal tint was produced, having:
pH=2.5
Specific Gravity=1.190 g/cc
Solids=49%

EXAMPLE NO. 24A

The conditions of Example 15A (Steps 1 to 11) were repeated. Then the following steps were taken:
12. The product was cooled to 30°-35° C. when 20 g of dimethylhydrogenphosphite (DMP) (B III/a) was added over a 10 minute period.
13. The agitation was continued for an additional 30 minutes.
14. The mixture was cooled to 25°-30° C. when a colorless liquid was obtained.

The polymer with double anion charge, ammonium-chloride and phosphonium, is obtained, having:
pH=3.5
Specific Gravity=1.193 g/cc
Solids=53%.

750 g of the above product was diluted with 150 g of dionized water. To this mixture was added 100 g aluminum sulfate, over a 15 minute period, the reaction being continued for an additional 30 minutes. The resulting product has:
pH=2.9
Specific Gravity=1.180 g/cc
Solids=50%

EXAMPLE No. 24 B

The conditions of Example 16 A were repeated (steps 1 to 10). Then the following steps were taken:
11. The Product was cooled to 50°-55° C. when 20% by weight of tetrakis-(hydroxymethyl)-phosphonium chloride was added to the total batch during a 5 minute period.
12. Agitation was continued for 30 minutes.
13. The prepolymer was cooled to 25°-30° C.
14. The resulting product has:
    pH=4.0
    Specific Gravity=1.266 /cc.
    Appearance=water color EXAMPLE No. 24 C The conditions of Example 24 B were repeated. The tetrakis-(hydroxymethyl) phosphoniumchloride being substituted B greater than tris-(3-chloro-2-hydroxypropyl)-hydroxymethylphosphonium chloride. (TCHMPC)
The resulting product has:
pH=3.0
Specific Gravity=1.259 g/cc
Appearance=clear yellow viscous solution.

EXAMPLE No. 24 D

The conditions of Example 24 C were repeated. The (TCHMPC) was substituted by 5% of Maxichem 8642 (tradename), a polyalkylguanidine polymer in which the alkyl is a $C_{12}$ radical, resulting in a soft wax, with solids=81%, a 5% solution of which has pH=4.55.
The resulting product has:
pH=3.7
Specific Gravity=1.194 g/cc
Appearance=transparent, light haze EXAMPLE No. 25

To the reactor described in Example No. 1 was charged:

| | | |
|---|---|---|
| (1) Dicyandamide | 198 g | 2.238 moles |
| (2) Monoethanolamine | 20 g | 0.237 moles |
| (3) 37% Formaldehyde | 320 g | 4.064 moles |
| (4) Dionized water | 72 g | 4.0 moles |
| (5) Ammonium Chloride | 114 g | 2.131 moles |

Steps No. 5 to 9 of Example No. 1 were followed, then:
(8) The product has:
pH=4.1
Specific Gravity=1.228 g/cc
Solids=62%.
(9) The above product was diluted to 45% solids with a specific gravity of 1.154 g/cc.
(10) To 438.45 g of the polymer was added under agitation 3.05 g of HCl(18%) and mixed for 10 minutes.
(11) Then 58.45 g of 25% alum was added during a 10 minute period and reacted for an additional 30 minute period at 25°-30° C. It resulted in a product having:
pH=3.05,
Specific Gravity=1.140 g/cc,
Solids=48%,
Appearance=light yellow tint blue color.

EXAMPLE No. 26 A

The conditions of Example No. 25 (steps 1 to 9) are repeated by substituting alum with 25% aluminumhydroxy chloride. The product has:
pH=2.8,
Specific Gravity=1.160 g/cc,
Solids=47%.
Appearance=clear liquid with light blue tint colloidal color.

EXAMPLE No. 26 B

To 980 g of 25% aluminum hydroxychloride is added 20 g of guanidine polymer as in Example 26A (steps 1 to 9) to obtain water color product having:

pH=4.05
Specific Gravity=1.115 g/cc

EXAMPLE NO. 26C to 980 g of aluminum sulfate as 48.5% aqueous solution is added 30% by weight of Maxichem 99CGS (tradename) (polycyanoguanidine sulfate). The mixture is mixed for 15 minutes and the resulting product has:
pH=1.55
Specific Gravity=1.204 g/cc
Appearance=light yellow with colloidal reflection.

EXAMPLE No. 27

The conditions of Example No. 26A are repeated by substituting the hydroxyaluminum chloride with 25% solution of polyhydroxyaluminummagnesiumchloride (PHAMC) $Al_3Mg(OH)_9(Cl)_2$, made from powder. The end product has:
pH=2.5,
Specific Gravity=1.140 g/cc,
Solids=45%,
Appearance=clear liquid which after 3 hours turns into a stable light blue colloidal color.

EXAMPLE No. 28

The conditions of Example No. 27 are repeated by substituting the (PHAMC) with polyhydroxyaluminumzincoxide chloride $Al_3(OH)_3ZnO(OH)(Cl)_5$ or (PHAZOCl). The product has:
pH=1.8,
Specific Gravity=1.185 g/cc,
Solids=43%
Appearance=light yellow with a blue tint color.

EXAMPLE Nos. 29–44

The conditions for Example No. 25 are repeated by substituting the monoethanolamine with one of the following products or (1:1) mixture of them.

| Ex. No. | Product - Nitrogen Derivative | Co Catalyst HCl (50/50) | Reaction Conditions | |
|---|---|---|---|---|
| 29 | Ethylene diamine | Yes | 4 hrs. | 90–95° C. |
| 30 | Ethylene diamine HCl | | 1 hrs. | 80–85° C. |
| | | | 3 hrs. | 90–95° C. |
| 31 | Diethanol amine | Yes | 4 hrs. | 90–95° C. |
| 32 | Aminoethylethanolamine | Yes | 4 hrs. | 90–95° C. |
| 33 | Hydroxyethylethylenediamine | Yes | 4 hrs. | 90–95° C. |
| 34 | Hydroxypropylethylenediamine | Yes | 4 hrs. | 90–95° C. |
| 35 | Guanidine-bis-N,N'—hydroxy- | Yes | 1 hrs. | 80–85° C. |
| | ethylenediamine | | 3 hrs. | 90–95° C. |
| 36 | N,N'—Bisguanidineethylene- | | 1 hrs. | 80–85° C. |
| | dimaine | Yes | 3 hrs. | 90–95° C. |
| 37 | N,N'—Hydroxymethylethylene- | Yes | 1 hrs. | 80–85° C. |
| | diamine | | 3 hrs. | 90–95° C. |
| 38 | N,N'—bisguanilurea | Yes | 4 hrs. | 90–95° C. |
| 39 | 2(2-aminoethoxy)ethanol | Yes | 3 hrs. | 80–85° C. |
| | | | 1 hrs. | 90–95° C. |
| 40 | Polyethyleneimine | Yes | 2 hrs. | 80–85° C. |
| | (Mw ≦ 100,000) | | 2 hrs. | 90–95° C. |
| 41 | Polydially Dimethylammoniumchloride | | | |
| | (Mw ≦ 500,000) | Yes | 0.5 hrs. | 30–40° C. |
| 42 | N,N'—bishydroxymethyl- | Yes | 1 hrs. | 80–85° C. |
| | ethylenediamine | | 2 hrs. | 90–95° C. |
| 43 | 2-amino-2ethyl-1,1,3 propanediol | | 1 hrs. | 80–85° C. |
| | | | 2 hrs. | 90–95° C. |
| 44 | Tris (hydroxymethyl)- | | 1 hrs. | 80–85° C. |
| | aminomethane | | 2 hrs. | 90–95° C. |

To the reactor described in Example Number 1 is charged:

| | | |
|---|---|---|
| 1. Dicyandiamide | 250 gr. | 2.976 moles |
| 2. 37% Formaldehyde | 480 gr. | 5.911 moles |
| 3. Dionized water | 45 gr. | 2.90 moles |
| 4. N,N'- bisguanidineethylene-diamine | 20 gr. | 0.091 moles |
| 5. HCl (18%) | 25 gr. | 0.205 moles |
| 6. Ammonium chloride | 160 gr. | 2.991 moles |

Steps number 6 and 7 of Example Number 1 are followed, with the exception that the mixture is reacted for 1 hour at 80°-85° C., followed by 3 hours at 90°-95° C. The resulting product has the following characteristics:
pH=3.2
Specific Gravity=1.214 g/cc
Solids=60%
8.-803.10 g. of this product is treated with 26.6 g of HCl (30%) and reacted for 10 minutes. The 170.3 g of polyhydroxyaluminum calciumchloride ($Al_7Ca_{0.0-4}(OH)_{17.01}(Cl)_4$ having a pH=2.45 and Specific Gravity=1.402 g/cc, is added during 10 minutes at 25°-35° C. The composition is reacted for 30 minutes and then cooled to room temperature. The resulting product has:
pH=3.38
Specific Gravity=1.206 g/cc
Appearance=transparent, with light yellow tint.

EXAMPLE No. 45

The conditions of Example Number 36 were repeated by substituting in Step Number 7 the polyhydroxyaluminumcalciumchloride with polyhydroxyaluminummagnesiumsulfate (PHAMS) $Al_4Mg(OH)_5(SO_4)_{3.5}$, having;
pH=2.55
Specific Gravity=1.320 g/cc Solids=38%

To 801.50 g of polyamine made as in steps 1 to 6 of Example Number 30 is added 198.5 g of (PHAMS) during 15 minutes at 25°-30° C. The reaction is continued for an additional 30 minutes. The end product has the following properties:

pH=2.95

Specific Gravity=1.211 g/cc

Appearance=water color with a clean light yellow tint reflection.

EXAMPLE No. 46

| | | |
|---|---|---|
| 1. Dicyandiamide | 168 g | 2 mole |
| 2. Hydrochloride acid (37%) | 486.11 g | 4.925 mole |
| 3. Dionized water | 13.89 g | 0.772 mole |

4. Start mixing
5. The reaction is exothermic.
6. Let the exotherm go no higher than 80°-85° C. and hold for 1 hour.
7. To the reactor was added 486 g (5.985 mole) of 37% formaldehyde and the reaction was heated to 90°-95° C., then was held for 5 hours.
8. Cool to 25° C., when a polyguanidineammoniumchloride was made (PGAC)
9. At the end of this time the product was drawn off having:
   pH=0.85
   Specific Gravity=1.240 g/cc.
   Solids=53%
   Appearance=water color product.

To 300 g of this product was added during 5 minutes 30 g. of polyamine (made from epichlorohydrin-dimethylamine-ethylendiamine, as described in Example Number 3 of U.S. Pat. Re 28,807.)

Under agitation to the above mixture was added during 10 minutes 30 g of hydroxyaluminumchloride (40% aqueous solution). The reaction was continued for 30 minutes when stable viscosity and pH was obtained. The product has:

pH=1.3

Specific Gravity=1.174 g/cc

Solids=45%

Appearance=light yellow to amber color.

EXAMPLE No. 47

To 300 g of the polyhydroxyaluminumagnesium sulfate $[Al_4Mg(OH)_5(SO_4)_{3.5}]$. was added 30 g. of aluminumhydroxychloride (40% aq.) during 10 minutes and mixed until the pH became constant, forming polyhydroxyaluminumagnesiumchlorosulfate as inorganic polymer. To this composition under agitation was added 30 g of polyguanidineammoniumchloride of Example Number 46 and mixed for 45 minutes. The end product has:

pH=2.65,

Specific Gravity=1.279 g/cc,

Solids=40%,

Appearance=light yellow to amber color.

EXAMPLE No. 48

To the reactor described in Example Number 1 was charged:

| | | |
|---|---|---|
| 1. Dicyandiamide | 164 g | 1.952 moles |
| 2. Urea | 60 g | 1.0 moles |

-continued

| | | |
|---|---|---|
| 3. 37% Formaldehyde | 243.60 g | 2.993 moles |
| 4. Ammonium chloride | 25.2 g | 0.467 moles |

5. Start agitation
6. The endotherm of the reaction dropped to 9° C., followed by
7. The exotherm reation was kept below 65° C.-70° C.
8. To this composition was added 222.57 g (1.831 moles) of HCl (30%)
9. The composition was slowly heated to 90°-95° C., then was reacted for 4 hours.
10. The product was cooled down when water colored product of polyguanylureaammoniumchloride was obtained. (PGUAC)
11. The product at this point has:
    pH=3.70
    Specific Gravity=1.222 g/cc
    Solids=53%
    Appearance=water color.
12. To 425 g PGUAC, under agitation was added 11 g of HCl (18%).
13. Agitation was continued for 15 minutes until the pH remained constant.
14. During a 10 minute period was added 65 g of 20% aluminumhydroxychloride.
15. The reaction was continued for 20 minutes when the inorganic-organic alloy polymer was produced with:
    pH=2.6,
    Specific Gravity=1.238 g/cc
    Solids=45%
    Appearance=water color with colloidal blue refraction.

EXAMPLE No. 49

To the 300 g of the product made in Example Number 46 was added 100 g of dionized water. Agitation continued. During a 5 minute period was added 42 g polyethyleneimine (PEI) with very high molecular weight. Then under high agitation during 10 minute period was added 100 g of hydroxyaluminumchloride $(Al_2(OH)_5Cl(HAlCl)$. After 30 minutes the pH remained constant and the organic-inorganic alloy polymers were obtained, having:

pH=2.70,

Specific Gravity=1.149 g/cc,

Solids=35%

Appearance=yellow color.

EXAMPLE No. 50

The conditions of Example Number 49 were repeated by substituting for aluminumhydroxychloride with 150 g of polyaluminum-ferric/ferrous chloride $$[AlFe_{0.25}^{II}Fe_{0.25}^{III}(OH)_{2.12}(Cl)_{2.13}].$$

After 20 minutes of mixing, an organic-inorganic adduct was obtained having:

pH=1.90,

Specific Gravity=1.195 g/cc.

Solids=25%.

Appearance=light brown liquid.

EXAMPLE NO. 51

The conditions of Example Number 49 were repeated in the presence of 30 g of polyethyleneamine with very high molecular weight (Mw) and 150 g. of 40% $FeCl_3$ of (HAlC). After 30 minutes of reaction, an organic-inorganic alloy polymer was obtained with:

pH=0.3,
Specific Gravity=1.210 g/cc,
Solids=30%
Appearance=clean dark brown color.

EXAMPLE NO. 52

The conditions of Example No. 46 were repeated by substituting the 37% HCl with 302 g (2.003 moles) of 65% phosphoric acid. The reaction was continued for 9 hours at 90°-95° C., then was cooled to room temperature resulting in polyguanylureaphosphate with:

pH=2.30,
Specific Gravity=1.218 g/cc,
Solids=47%
Appearance=water color.

EXAMPLE No. 53

The conditions of Example Number 47 were repeated by substituting (PHAMS) with 330 g of hydroxyaluminumchloride (20% aq. solution). The end product has:

pH=2.25
Specific Gravity=1.185 g/cc,
Solids=38%
Appearance=water color.

EXAMPLE No. 54

To 300 g (50%) of polydiallyldimethylammonium-chloride (PDADMAC) was added during 10 minutes 300 g (50%) of polyhydroxyaluminumagnesiumsulfate (PHAMS) (41% aqueous solution). The composition was mixed for 20 minutes until the viscosity and pH remained constant. A light yellow color viscous addict polymer was produced, having:

pH=2.32
Specific Gravity=1,185 g/cc
Solids=45%

EXAMPLE NO. 55

The conditions of Example No. 54 were repeated by substituting the (PHAMS) with polyhydroxyaluminum-calciumchloride ($Al_7Ca_{0.04}(OH)_{17.01}(Cl)_4$) with:

pH=2.45,
Specific Gravity=1.402 g/cc.

The composition was mixed for 30 minutes when a product was produced having a water color to very light yellow color, with the characteristics:

pH=2.95
Specific Gravity=1.184 g/cc
Solids=56%

EXAMPLE No. 56 A

To 774 g of guanidinepolymer of Example 37 (having a pH=4.8) was added slowly 154.8 g of dionized water followed by 71.2 g of polydiallyldimethyl ammonium chloride (PDADMAC) *or* melamine formaldehyde polymer during 5 minutes. To the resulting mixture was added HCl (1:1) to obtain the final pH=3 to 3.5. The composition was mixed for 20 minutes. A clear light brown polyer was produced, having:

pH=3.4
Specific Gravity=1.158 g/cc
Appearance=clear light brown (transparent solution)

EXAMPLE No 56 B

The conditions of Example 56A were repeated substituting polyacrylamide (Manich polymer)-melamine formaldehyde copolymer for the polyallyldimethyl ammonium chloride—melamine formaldehyde copolymer. A clear product was obtained having:

pH=2.9
Specific Gravity=1.153 g/cc
Appearance=lear water

EXAMPLE No. 57

The conditions of Example Number 54 were repeated by substituting the (PHAMS) with 48% polyhydroxyaluminumchlorosulfate (PHAMCS). $Al_4MG(OH)_6(Cl)_4(SO_4)_2$. The end product has:

pH=2.05
Specific Gravity=1.170 g/cc
Solids=45%
Appearance=yellow color.

EXAMPLE No. 58

To 400 g (54.56%) of the product in Example 57 was added 100 grams of HCl (0.1 N) and mixed for 10 minutes. During a 15 minute period, 50 grams (6.82%) of the polyguanidine polymer produced in Example 25 was added. After a 10 minute reaction time, 183 grams of HCl (0.1 N) (38.62%) was added and mixed for 20 minutes. The end product has:

pH=1.8
Specific Gravity=1.100 g/cc
Solids=20%
Appearance=tint blue colloidal color.

EXAMPLE No. 59

To 300 grams of polydiallyldimethylammoniumchloride (POLYDADMAC) (45.87%) was added during 12 minutes 100 grams of polyaluminumferrousferricchloride (15.28%). The composition was mixed for 15 minutes until the viscosity and pH remained constant. To this dark brown composition having a pH of 2.85 was slowly added 200 grams of HCl (0.1 N) (30.57%) followed by 54 grams of polyguanidine polymer made in Example 25 (8.28%). After 20 minutes, a semiviscous adduct polymer was produced having:

pH=2.0
Specific Gravity=1.036 g/cc
Solids=26% (by moisture)
Appearance=clear, light brown color (transparent)

EXAMPLE No. 60

To the reactor described in Example 1 was charged 290 grams (2.0 moles) adipic acid, 200 grams (1.938 moles) diethylenetriamine, and 96.3 grams (5.35 moles) water. Aminopolyamide is made in accordance with Example Number 4 of U.S. Pat. No. 3,311,594, and 140 grams of such aminopolyamide having 50% solids is mixed with 29.4 grams of HCl (18% by weight). The composition is mixed for 15 minutes at 25° to 30° C., followed by the addition of 23.8 grams of polyhydroxyaluminumzincoxide chloride $Al_3(OH)_3ZnO(OH)(Cl)_5$. The reaction is continued for an additional 30 minutes, which produces an inorganic-organic alloy, having:

pH=3.2
Specific Gravity=1.095 g/cc

Appearance=light brown color, fluid

EXAMPLE No. 61

The polyamide described in Example Number 58 is made by using:

| | | |
|---|---|---|
| 1. Diethylenetriamine | 212.1 g | 2.055 moles |
| 2. Water | 77.8 g | 4.322 moles |
| 3. Adipic acid | 284 g | 1.945 moles |

4.-Under agitation and nitrogen blanket, the adipic acid is dissolved at 70°-90° C.

5.-The composition is slowly heated to 120° C. and held for 1 hour.

6.-Then it is heated slowly to 165°-175° C. and held for 3 hours.

7.-The product is cooled to 150°-155° C. when 426.1 g (23.672 ) of $H_2O$ is added and temperature held at 95° C.-105° C. for 60 minutes 8.-A brown transparent aminopolyamide is obtained, having 50% solids.

9.-The polymer is cooled to 30° C.

10.-To 396 g. of amidopolyamine is added 100 g of polyfunctional polyamine (B,II/e $C_{12}H_{26}N_2O_2Cl_2$) and sufficient water to bring the solids to 30% bw.

11.-The composition is heated to 90° to 95° C. for 2.5 hours and then cooled.

12.-A strong cationic charged aminopolyamide is obtained by the structure believed to be:

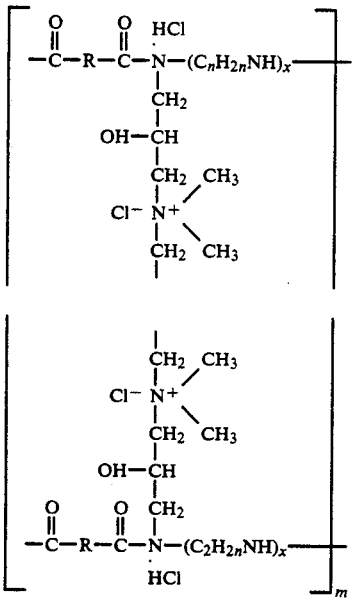

where m≧1, R=divalent aliphatic hydrocarbon, this intermediate product having:

pH=8.10,

Specific Gravity=1.050 g/cc,

Solids=25%.

Appearance=light brown color,

13. To 100 g of the above polyaminoamide product, 1.30 mg of HCl (18% bw) is added at the temperature 25° to 30° C.

14. The agitation is continued for 20 minutes.

15.-20 g of 20% hydroxyaluminumchloride ($Al_2(OH)_5(Cl)$) is added.

16.-The reaction is continued for an additional 30 minutes when the inorganic-organic alloy primer is produced having:

pH=3.7,

Specific Gravity=1.123 g/cc,

Appearance=light yellow color.

EXAMPLE No. 63

300 g of the product made in Example Number 15A is diluted with 100 g of dionized water. Under agitiation was added 42.4 g of HCl (18% bw). To this solution was added during 10 minutes 25 g of the aminepolyamide made as in Example Number 61. The composition is mixed 30 minutes at room temperature. The product has:

pH=3.0,

Specific Gravity=1.130 g/cc,

Appearance=light yellow color.

To 84% by weight of this composition is added slowly 16% by weight of hydroxyaluminumchloride ($Al_2(OH)_5Cl$) as 20% solution. The composition is mixed for 15 minutes, resulting in a product having:

pH=3.25,

Specific Gravity=1.105 g/cc,

Appearance=clear water color.

EXAMPLE No. 64

To 959.1 g of 25% by weight solution of hydroxyaluminum sulfate ($Al_2(OH)_4SO_4$), having pH=2.55, is added 68.9 g of the aminopolyamide as made in Example Number 61. The reaction is carried out at 25° to 30° C. for 30 minutes, then the anion $Cl^-$ is exchanged by multi aluminum anion composition such as $[Al(OH)_2(SO_4)]^-$. The product has:

pH=2.80,

Specific Gravity=1.160 g/cc,

Appearance=light yellow color

EXAMPLE No. 65

To 270 g 25% by weight of hydroxyaluminum chloride ($Al_2(OH)_5Cl$) with pH=4.0 is added during 10 minutes 20 g of the aminopolyamide made as in Example Number 61. After 30 minutes of mixing at 25° to 30° C. the adduct has:

pH=4.65,

Specific Gravity'1.104 g/cc,

Appearance=light yellow color.

To further exemplify and demonstrate the improved characteristics of the flocculating material disclosed above, numerous tests were conducted. These tests and their results are discussed below.

TEST I

Super concentrated acrylic sizing latex waste from an ultrafiltration unit was treated with 600 parts per million (ppm) doses fo conventional ferric chloride ($FeCl_3$) alum (aluminum sulfate-$Al_2(SO_4)_3$, $Al_2(SO_4)_3 18H_2O$) and the products I, II, and III. The results of this treatment are indicated below.

| Parameter | Before treatment | After treatment with 38% $FeCl_3$ | with 48.50% Alum | with Product I | II | III | IV | V |
|---|---|---|---|---|---|---|---|---|
| Chemical Oxygen Demand (COD) | 45963 | 34000 | 32000 | 6500 | 8100 | 5200 | 4500 | 12,000 |

where:
I is polyhydroxyaluminumagnesiumchlorosulfate (PHAMCS) or $(Al_4Mg(OH)_6(Cl)_4(SO_4)_2$. *as A = 100%*
II is 50% ASTRINGEN, or hydroxyaluminumchloride $(Al_2(OH)_5Cl)$; (trade name of Robinson Wagner Company, Inc.). *as A = 100%*
III is inorganic-organic alloy (PDADMAC/PHAMS - see Example No. 54);
IV is inorganic-organic alloy polymer based on PDADMAC; polyhydroxyaluminumcalciumchloride $(Al_7Ca_{0.04}(OH)_{17.01}(Cl)_4$. See Example No. 55.
V is PDADMAC (polydiallyldimethyl ammoniumchloride). *as $D^+$ = 100%*

The products III and IV provided highly satisfactory results with supernatant water charity, no back pressure, very fast filtration, and low moisture on the sludge cakes, which make them very economical to be applied to a plant incineration system.

TEST III

Plant effluent waste water from paper mill plant with turbidity over 10,000 NTU was treated with 200 milligram per liter, pH=7.5. The results were as follows:

| Product | Turbidity before treatment (NTU) | Turbidity after Treatment (NTU) No pH Adjustment |
|---|---|---|
| | 10.000 N.T.U. | |
| Product - VIII. (2:1) Example #1 (step #1 to 10) *as $B^+$ = 100%* and Example #52 | | 7.8 |
| Product - IX. (Example #36) | | 6.5 |
| Product - X (Example #24B) | | 6.5 |
| Product-V | | 4.5 |
| Product-XI. (Example #46) | | 4.5 |
| Product-XII. (Example #49) | | 5.5 |
| Product-XIII. (Example #50) | | 8.8 |
| $FeCl_3$ (30%) *as A = 100%* | | 42 |
| Product-XIV (Polyferrous ferricchloride) *as A = 100%* | | 15 |
| Alum (48.5%) *as A = 100%* | | 38 |

TEST II

Waste water from paper mill plant effluent (black liquor and bleach water (50/50) with color over 20,000 APHA was treated at pH=6.5 with 200 milligram per liter doses. The results of this treatment are indicated below:

| Product | Before Treatment | Color Removal (%) |
|---|---|---|
| | 20000 APHA | |
| Product V | | 87% |
| Product VI | | 85% |
| Product VII | | 86% |
| Example 1 | | 83% |
| Example 24D | | 85% |
| Example 25 | | 89% |
| Magnofloc (a): | | |
| C - 509 (Melamine resin) *as C = 100%* | | 64% |
| 585 - C (Polyamine) *as C = 100%* | | 53% |
| Agefloc (b): | | |
| WT - 40 (PDADMAC) *as $D^+$ = 100%* | | 55% |
| Betz: 1275 (Polyamine) | | 57% |
| NALCO: 8102 (Polyamine) *as C = 100%* | | 70% |

Where (V) is the product of Example Number 15A, *as $B^+$ = 100%*
(VI) is the product of Example Number 16A, *as $B^+$ = 100%*
(Note that the products V and VI removed up to 90 to 93% of the color when 300 milligram per liter dosage was used.) *as $B^+$ = 100%*
(VII) is (2:1) ratio of the products made on Example 1 (Steps number 1 to 10) and Example Number 52.
Example 1 (product of steps 1 to 10) *as $B^+$ = 100%*
Example 24D
Example 25 (product of steps 1 to 10) *as $B^+$ = 100%*
(a) Magnofloc - Trade name of American Cyanamid Co.
(b) Agefloc - Trade name of C.P.S. Chemicals Company. *as $D^+$ = 100%*

TEST IV

Water used to wash the air in paint or lacquer spray booth in order to remove over-sprayed paint or lacquers was treated with 250 milligrams per liter (ppm) at pH=9 to 10, by a sodium aluminate adjustment, with the following detackifier compositions. The results are indicated below:

| Product | Water mls | Paint mls | Detackification Grade | Observed Water Clarity Gardner Scale Color |
|---|---|---|---|---|
| Product XV | 250 | 5.5 | 1 | 0 |
| Product XVI | 250 | 5.5 | 2 | 0 |
| Product XVII | 250 | 5.5 | 1 | 0 |
| Product XVIII | 100 | 2.18 | 1 | 0 |
| Product XIX | 100 | 2.18 | 3 | 3 |

where XV is Maxichem - 962 (a polyamine of Maxichem Inc.), *as C = 100%, melamine-formaldehyde-cyanoguaidine condensate;*
XVI is Maxichem - 964 (a polyamine of Maxichem Inc.), *as C = 100%, melamine-formaldehyde protonized;*
XVII is Maxichem - 957 (a polyamine of Maxichem, Inc.), *as C = 100%, melamine-formaldehyde-glyoxal protonized*

The Gardner Color Scale is:
0-water color; 1-white; 2-slightly yellow; 3-yellow; 4-brownish yellow; 5-brown; 6-dark brown; 7-dark, blackish color.

Detackification grade units are arbitrarily defined as: 1-very good; 2-good; 3-fair; 4-poor; 5-unacceptable.

TEST V

A 5% aqua emulsion mixture (freon extracts 15,200 ppm) from Nylon Finishing product which is composed from white mineral oil, peanut oil, oleic acid, glycerol oleate, butyl stearate, diethylene glycol, alkanolamine, solvent, sulfuric acid, caustic soda and formaldehyde was prepared. 1200 ppm of the following products were mixed for 90 minutes. After 2 hours, the two resulting layers were separated. The freon extracts from the water layer were evaluated:

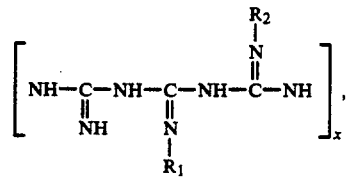

| Freon extraction | Before treatment ppm | Treated with the Products: at pH = 6.3 | | | | | | |
|---|---|---|---|---|---|---|---|---|
| | | Example #9 | #16A | #16B | #65 | Astrigen 50% | Alum 48.5 | $AlCl_3$ 10% $Al_2O_3$ |
| 5% emulsion mixture of Organic soap Fiber Finishing | 15,200 | 155 (ppm) | 105 | 100 | 93 | 379 | failure | failure |

| B/ Treated with the Products: | | |
|---|---|---|
| Sanfloc 700 | Magnafloc 575 | PDADMAC WT-40 |
| 185 (ppm) | 2688 | 1715 |

TEST VI

A coal mine waste water having a turbidity greater than 10,000 NTU was treated with 1000 ppm (as 5% by weight stock solutions) for 5 minutes with the following products and allowed to stand for 5 minutes.

| Product | Turbidity (NTU) 10,000 | Observed |
|---|---|---|
| *PDADMAC (very high Mw) | 300 | Suspension present |
| MAXICHEM -8642 | 130 | Almost no susp. present water color |
| Product 24[D] C | 240 | limited suspension present |

*as $D^+$ = 100%

From the foregoing, it is readily apparent that I have invented a group of novel inorganic-organic alloy copolymers, and a method of making such compositions, which are well suited for environmental uses, including purifying industrial waste water and other industrial waste liquids, solids or semiliquids, from chemical plants, demulsification processes, the pulp and paper industry, mining and clay industries, textile manufacturing, sugar refining, soap manufacturing, petroleum operations, the chemical and rubber industries, tanning operations, and construction and agricultural operations.

What is claimed is:

1. Water-soluble inorganic-organic alloy polymer adduct composition for purification of potable water, acid rain water, paper mill effluent, industrial waste water, industrial waste liquids, solids and semiliquids, water-borne waste and paint, said composition having the formula:

$$A.B^+.C.D^+$$

wherein $A=[Me_m^{II}Me_n^{III}(OH)_p(SO_4)_y(Aci)(2m+3n)-p-2y]_r$, where r=0 to 98% *and* $2m+3n>2y+p$;

[B=] $B^+=$ where x=2 to 98%;

$C=(PAM)_z(PAM-PAD)_{t+z}$;

$D=(PQAM)_w$;

$Me_m^{II}$ is selected from the divalent cation group comprising Mg, Zn, Ca, and $Fe^{2+}$;

m=0 to 5;

$Me_n^{III}$ is a tri-or more valent metal selected from the group comprising Fe, Al, and Al-Zr complexes;

n=1 to 20;

Aci is selected from the monovalent anionic group comprising $Cl^-$, $Br^-$, $I^-$, and $NO_3$;

PAM=polyamine;

PAD=polyamide;

PQAM=polyquaternized polymer;

p=0 to 75;

y=0 to 15 z=0 to 95% percent by weight of polyamine;

t=0 to 95% percent by weight of polyamide;

w=0 to 98% percent by weight of polyquaternized polymer; and $R_1$=bridge cationic or multiple organic cationic charge or mixture thereof *which can vary from 0 to 80% by weight.*

*$R_2$ alkyl phosphonic esters and/or amine derivatives, phosphonium cationic charge groups, such as tetrakis (hydroxymethyl)-phosphonium halide, hydroxide, oxalate, acetate, sulfate, phosphate, tri-hydroxymethyl-phosphonium or halide derivatives, or tetramethylhalide phosphonium halide derivatives, the halo-group being chlorine, bromine, or iodine, phosphorous acid and its esters or salts, $H_3PO_4$ and its salts, such as sodium dihydrogen phosphate, which can vary from 0 to 80% by weight.*

2. A composition according to claim 1 wherein A is selected from the group [comprising:] *consisting:*

$Al_m(OH)_nX_{3m-n-2k}(SO_4)_k$; $Al_{1-x}Fe_x^{II}Fe_y^{III}(OH)_{3+2y-2}(Hal)_z$;

$Al_m(OH)_x(SO_4)_y(H_2PO_4)_z$; $Me_n(OH)_mX_{3n-m}$; regular chloride, sulfate, phosphate, nitrate, or acetate salts of aluminum, iron, titanium, vanadium, zirconium, chromium, antimony, or a mixture thereof.

3. A composition according to claim 1 wherein $B^+$ is selected from the group [comprising] *consisting* polymers or resins made from guanidine, dicyandiamide, or cyanoguanidine compounds, copolymerized with cationic charges, multiple organic cationic charges, protonized agents, alkylamines, alkanolamines, alkyl, or hydroxyalkylguanidine, or any mixture thereof.

4. A composition according to claim 2, wherein D+ (PQAM) is selected from the group [comprising] *consisting* aqueous solutions of the quaternary ammonium compounds and their ethylenically unsaturated and their (co)polymerizable compounds.

5. Water-soluble inorganic-organic alloy polymer adduct composition for purification of potable water, acid rain water, paper mill effluent, industrial waste water, industrial waste liquids, solids and semiliquids, water-borne waste and paint, said composition having the formula:

$$A.B^{+}.C.D^{+}$$

wherein

A=5 to 95% by weight of polyhydroxyaluminum-chloride inorganic adducts polymer;

$B^{+}$=0 to 95% by weight of polymers of copolymerized dicyandiamide;

C=0 to 95% by weight of polyalkylamines, and 0 to 95% by weight of a mixture of polyalkylamine and an aqueous solution of cationic resin; and $D^{+}$=0 to 95% by weight of an aqueous solution of a quaternary ammonium compound.

6. Water-soluble inorganic-organic alloy polymer adduct composition for purification of potable water, acid rain water, paper mill effluent, industrial waste water, industrial waste liquids, solids and semiliquids, water-borne waste and paint, said composition having the formula:

$$A.B^{+}.C.D^{+}$$

wherein

A=0 to 98% by weight of polyhydroxyaluminum-magnesiumchloride inorganic adducts polymer;

$B^{+}$=0 to 95% by weight of polymers of copolymerized dicyandiamide;

C=5 to 95% by weight of polyalkylamines, and 0 to 95% by weight of a mixture of polyalkylamine and an aqueous solution of cationic resin; and $D^{+}$=0 to 95% by weight of an aqueous solution of a quaternary ammonium compound.

7. Water-soluble inorganic-organic alloy polymer adduct composition for purification of potable water, acid rain water, paper mill effluent, industrial waste water, industrial waste liquids, solids and semiliquids, water-borne waste and paint, said composition having the formula:

$$A.B^{+}.C.D^{+}$$

wherein

A==5 to 95% by weight of polyhydroxyaluminum-magnesium sulfate inorganic adducts polymer;

$B^{+}$=0 to 95% by weight of polymers of copolymerized dicyandiamide;

C=0 to 95% by weight of polyalkylamines, and 0 to 95% by weight of a mixture of polyalkylamine and an aqueous solution of cationic resin; and $D^{+}$=0 to 95% by weight of an aqueous solution of a quaternary ammonium compound.

8. Water-soluble inorganic-organic alloy polymer adduct composition for purification of potable water, acid rain water, paper mill effluent, [inductrial] *industrial* waste water, industrial waste liquids, solids and semiliquids, water-borne waste and paint, said composition having the formula:

wherein

A=5 to 95% by weight of polyhydroxyaluminum-chlorosulfate inorganic adducts polymer;

$B^{+}$=0 to 70% by weight of polymers of copolymerized dicyandiamide;

C=0 to 95% by weight of polyalkylamines, and 0 to 95% by weight of a mixture of polyalkylamine and an aqueous solution of cationic resin; and $D^{+}$=0 to 95% by weight of an aqueous solution of a quaternary ammonium compound.

*9. Water-soluble inorganic-organic, or organic adduct, or blend polymers composition for purification of potable water, acid rain water, pulp and paper mill streams or waste water, industrial water streams or waste water liquids, semiliquids or solids, for removal of suspended matters, leather or textile industries stream or waste water, water-borne spray paint or water wash spray booth, wherein said composition having formula:*

$$A.B^{+}.C.D^{+}$$

*which correspond to the formula*

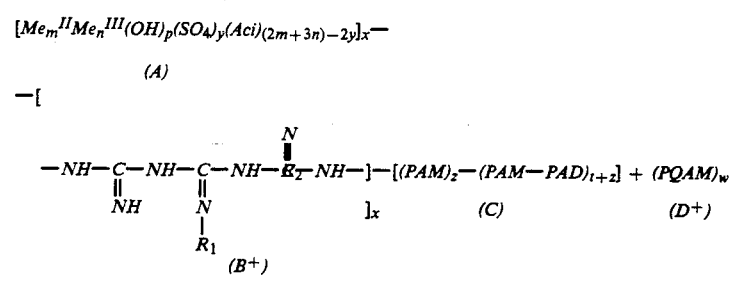

*with the proviso that the resulting polymer adduct or blend composition contains at least two of the four components recited in the formula $A.B^{+}.C.D^{+}$ and that at least two of the r,x,z,t+z,w are positive numerical value,*

*where:*

*r=0 to 98% percent by weight;*

*$Me_m^{II}$ is a divalent cation group selected from Mg, Ca, Zn, $Fe^{2+}$ and,*

*m=0 to 5;*

*$Me_n^{III}$ is a tri-or more valent metal, preferably Al, Fe, or Al-Zr complex, and*

*n=1 to 20;*

*Aci is selected from the monovalent anion group of (a)$Cl^{-}$, (b)$Br^{-}$, $I^{-}$, (d)$NO_3^{-}$, (e) $CH_3COO^{-}$, and (f) a mixture of these selected Aci is $Cl^{-}$;*

PAM, PAD and PQAM stand for water soluble polyamine, polyamide and polyquaternized or cationic polymers;

$p=0$ to 75;

$y=0$ to 15;

$2m+3n>2y+p$ $x=0$ to 98% by weight in compositions;

$z$=percentage by weight of the water soluble polyamine in the alloy composition, which can vary from 0 to 95%;

$t$=percentage by weight of the water soluble polyamide, which can vary from 0 to 95%;

$t+z$=percentage by weight of a water soluble mixture of polyamine-polyamide, which can vary in compositions in percentage from 0% to 95% by weight; $z>t$ $w$=percentage by weight of the water soluble quaternary ammonium polymer, polydiallyldimethyl ammonium chloride (PDADMAC), or water soluble cationic polyacrylamide and its copolymers, or allyltrialkylammonium polymer or its cationic or nonionic copolymer, nonionic polyacrylamide, or their copolymers or organic alloy or blends, which can vary in percentage from 0 to 98% by weight;

$R_1$ - refers to hydrogen, bridge cationic or multiple organic cationic charges, which can vary from 0% to 80% by weight $R_2$ - refers to hydrogen, alkyl phosphonic esters or amine derivatives, dialkyl hydrogen phosphite, phosphorous acid and its esters or salts, $H_3PO_4$ acid or its salts like sodium dihydrogen phosphate, phosphonium cationic charge groups, comprising tetrakis (hydroxymethyl)-phosphonium halide, hydroxide, oxalate, acetate, sulfate, phosphate, tri-hydroxymethyl-phosphonium or halide derivatives, or tetramethylhalide phosphonium halide derivatives, the halo-group being chlorine, bromine, or iodine, which may vary from 0 to 80% by weight.

10. The composition of claim 9 wherein the components present are A and $B^+$ in a weight percent ratio of $A:B^+$ of (1-99):(99-1).

11. The composition of claim 10 wherein the ratio of A to $B^+$ is (1-20):(80-99).

12. The composition of claim 11 wherein the ratio of A to $B^+$ is (50-96):(3-39).

13. The composition of claim 9 wherein the components present are $B^+$ and $D^+$ in a weight percent ratio of $B^+:D^+$ of (83-99):(1-17).

14. The composition of claim 9 wherein the components present are A and C in a weight present ratio of A:C of (2-93):(7-98).

15. The composition of claim 14 wherein the ratio of A:C is (93.5:1.5) or (6.5:98.5).

16. The composition of claim 9 wherein the components present are A and $D^+$ in a weight percent ratio of $A:D^+$ of (49-99):(1.0-51).

17. The composition of claim 16 wherein the ratio of $A:D^+$ is (49-56):(44-51).

18. The composition of claim 9 wherein the components present are $B^+$ and C in a weight percent ratio of $B^+:C$ of 95:3.5.

19. The composition of claim 9 wherein the components present are $A,B^+$ and C in a weight percent ratio of $A:B^+:C$ of (1-5):(20-94):(4-79).

20. The composition of claim 19 wherein the ratio of $A:B^+:C$ is (2-5):(52-94):(4-43).

21. The composition of claim 19 wherein the ratio of $A:B^+:C$ is (1:5):(20-52):(43-79).

22. The composition of claim 9 wherein the components present are $A,B^+,D^+$ in a weight percent ratio of $A:B^+:D^+$ (10-14):(3-84):(2-87).

23. The composition of claim 22 wherein the ratio of $A:B^+:D^+$ is 10:3:87.

24. The composition of claim 22 wherein the ratio of $A:B^+:D^+$ is 14:84:2.

25. The composition of claim 9 wherein the components present are $B^+$,C and $D^+$ in a weight percent ratio of $B^+:C:D^+$ of 96:3:1.

26. The composition according to claim 9 wherein A is selected from the group consisting of I(a) through I(f)

I(a): $[Me_m^I Me_n^{II} (OH)_p(SO_4)_y(Aci)_{(2m+3n)-p-2y}]$ wherein:

$Me_m^{II}$ is a divalent cation group from Mg,Zn,Ca,$Fe^{2+}$ and $m=0$ to 5;

$Me_n^{III}$ is a tri- or more valent metal, selected from Al,Fe or Al-Zr complexes, and = 1 to 20;

Aci is selected from a monovalent anion group consisting of (a) $Cl^-$, (b) $Br^-$, (c) $I^-$, (d) $NO_3^-$, (e) $CH_3COO^-$ or (f) a mixture of two or more of foregoing.

I(b): $Al_m(OH)_nX_{3m-n-2k}(SO_4)_k$ wherein:

X is sodium, potassium, chlorine k,m,n, are positive numbers.

I(c): $Al_{1-x}Fe_x^{III}Fe_y^{II}()H)_{3+2y-z}(Hal)_z$ wherein:

Hal=chlorine,bromine,iodine,or a mixture thereof;

$(x+y)/(1-x)$=about 0.2 to 1.5, $z<3+2y$, and $(3+2y-2)/(3+2y)$=about 0.24 to 0.67;

I(d): $Al_m(OH)_n(SO_4)_y(H_2PO_4)_z$ with the proviso that the sum of $x+2y+2$ is 3; m and x are positive integers; and y and z are 0 or positive integers.

I(e): $Me_n(OH)_mX_{3n-m}$ wherein:

m,n are positive integers $Me_n^{III}$ is a tri- or more valent metal, and

X is $Cl^-$, $Ch_3COO^-$, or $NO_3^-$;

I(f): regular salts of aluminum,iron,titanium,vanadium,chromium, antimonium, comprising chloride,sulfate,phosphate,nitrate, acetate or mixture thereof.

27. The composition of the claim 9 wherein A is selected from the following group of inorganic adduct polymers:

1. Polyhydroxyaluminumchloride; $Al_4(OH)_9(Cl)_3$, or $Al_8(OH)_21$, or $Al_{11}(OH)_{30}(Cl)_3$
2. Hydroxyaluminumchloride: $Al_2(OH)_5Cl$ as chlorhydrol TR-50, Astrigen TR-50.
3. Polyhydroxyaluminum magnesiumchloride; $Al_3Mg(OH)_9(Cl)_2$
4. Polyhydroxyaluminumcalciumchloride: $Al_7Ca_{0.04}(OH)_{17.01})Cl)_4$;
5. Polyhydroxyaluminum magnesiumsulfate: $Al_4Mg(OH)_4(SO_4)_{3.5}$
6. Hydroxyaluminum sulfate: $Al_2(OH)_4(SO_4)$;
7. Oxialuminum sulfate: $Al_2O(SO_4)_2$
8. Polyhydroxyaluminumzincoxidechloride: $Al_3(OH)_3ZnO(OH)(Cl)_2$
9. Polyhydroxyaluminum and/or magnesiumchlorosulfate: $Al_4(OH)_6(Cl)_4(SO_4)$; $Al_4Mg(OH)_6(Cl)_4(SO_4)_2$; or $Al_3Mg(OH)_6(Cl)_3(SO_4)$;
10. Polyaluminumferric and/or ferrous chloride: $Al_2Fe_2(OH)_{3.32}(Cl)_{6.68}$ $AlFe_{0.25}{}^{I}Fe_{0.25}{}^{III}(O)(H)_{2.12}(Cl)_{2.12}$;

11. Polyaluminumchloridesulfate; and

12. Polyhydroxyaluminumchloro silicate;

13. Aluminumzirconium(penta or tetra)chlorohydrate $Al_8Zr(OH)_{22}(Cl)_5$ or $Al_4Zr(OH)_{12}(Cl)_4$.

28. Inorganic-organic or organic alloy polymer adduct composition for purification of potable water, industrial water streams or waste water treatment, or water-borne spray paint booth or water wash spray booth, paint booth waste water said composition having formula:

$$A.B^{+}C.D_{+}$$

with the proviso that resulting polymer alloy or blend contain at least two of the four components recited and provided that at least one of the components present is A or $B^{+}$ or $D^{+}$, wherein:

A is from 0% to 98% by weight of the total alloy composition, and is selected from the group comprising: polyhydroxyaluminumchloride, hydroxyaluminumchloride, polyhydroxyaluminum magnesiumchloride, polyhydroxyaluminum magnesiumsulfate, hydroxyaluminumsulfate, oxialuminumsulfate, polyhydroxyaluminumzincoxidechloride, polyhydroxyaluminumchlorosulfate, polyaluminumferric chloride, polyaluminumferrous-chloride, polyaluminumchloridesulfate, polyhydroxyaluminumsilicate, and polyhydroxyaluminumsodium sulfophosphate;

$B^{+}$ is from 0 to 98% by weight of the total alloy composition, and is selected from the group comprising polymer or resin made from guanidine, dicyandiamide, or cyanoguanidine copolymerized with cationic charges monomer or multiple organic cationic charges, protonized agents, alkyl amine, alkanol amine, alkyl or hydroxyalkylguanidine, or mixture thereof, C is from 0 to 95% by weight of the total alloy composition, and is an aqueous solution of cationic resin selected from polyalkyl amine, polyamine, polyethylenepolyamine, N-substituted ethyleneimines, polyquaternaryamine, 1,3-bisquaternaryammonium amine, water soluble colloidal cationic melamine-formaldehyde or melamine-urea-formaldehyde resins, and $D^{+}$ is from 0% to 95% by weight of total alloy or blend composition, and is selected from the group of aqueous solution of the quaternary ammonium polymer comprising polydiallyldimethyl ammonium chloride(PDADMAC), water soluble cationic polyacrylamide and its copolymers, POLYDADMAC- melamine-formaldehyde alloy, Manich type (co)polyacrylamide- melamine-formaldehyde alloy or blend polymers incorporated therein.

29. The composition of claim 9 wherein the component $B^{+}$ is selected from the guanidine compounds and resin guanidine resin or polymer cationic charged guanidine or cyanoguanidine of formula B(1) through B(7).

30. The composition of claim 9 wherein the component C is selected from water soluble cationic polyamine, alkyl polyamine, polyamine-polyamide, water soluble cationic colloidal melamine-formaldehyde or melamine-urea-formaldehyde resins.

31. The composition of claim 9 wherein the component $D^{+}$ is selected from aqueous solution of quaternary ammonium compound, water soluble cationic polyacrylamide and its copolymers, POLYDADMAC, POLYDADMAC-melamine-formaldehyde alloy, Manich type (co)polyacrylamide-melamine-formaldehyde alloy polymers, polyacrylamide, (co)polymers of hydrochloride of N,N-diglycine- polydiallylamine, or mixture thereof.

* * * * *